United States Patent
Baird et al.

(10) Patent No.: US 10,076,105 B2
(45) Date of Patent: Sep. 18, 2018

(54) DARTING FISHING LURE

(71) Applicants: Scott David Baird, New Kensington, PA (US); Steven Douglas Baird, Murrysville, PA (US)

(72) Inventors: Scott David Baird, New Kensington, PA (US); Steven Douglas Baird, Murrysville, PA (US)

(*) Notice: Subject to any disclaimer, the term of this patent is extended or adjusted under 35 U.S.C. 154(b) by 103 days.

(21) Appl. No.: 15/261,979

(22) Filed: Sep. 11, 2016

(65) Prior Publication Data

US 2018/0070569 A1 Mar. 15, 2018

(51) Int. Cl.
  *A01K 85/18* (2006.01)

(52) U.S. Cl.
  CPC .................................. *A01K 85/18* (2013.01)

(58) Field of Classification Search
  CPC ................................................ A01K 85/16
  USPC ............................................... 43/42.45
  See application file for complete search history.

(56) References Cited

U.S. PATENT DOCUMENTS

| | | | | |
|---|---|---|---|---|
| 1,490,389 A * | 4/1924 | Hayes | .................. | A01K 85/16 43/42.28 |
| 1,558,470 A * | 10/1925 | Gibson | .................. | A01K 85/16 43/42.48 |
| 2,013,898 A * | 9/1935 | Ridenour | .................. | A01K 85/16 43/42.09 |
| 2,038,127 A * | 4/1936 | Pflueger | .................. | A01K 85/00 29/530 |
| 2,183,849 A * | 12/1939 | Swanberg | .................. | A01K 85/16 43/42.35 |
| 2,483,245 A * | 9/1949 | Steinhart | .................. | A01K 85/16 43/42.32 |
| 2,663,112 A * | 12/1953 | McMillin | .................. | A01K 85/16 43/42.09 |
| 2,674,059 A * | 4/1954 | Boyd | .................. | A01K 85/16 43/42.09 |
| 2,883,786 A * | 4/1959 | Smith | .................. | A01K 85/16 43/42.22 |
| 3,408,764 A * | 11/1968 | McCurry | .................. | A01K 85/16 43/42.09 |
| 3,641,698 A * | 2/1972 | Varaney | .................. | A01K 85/16 43/42.48 |
| 3,738,046 A * | 6/1973 | Johnson | .................. | A01K 85/16 43/42.39 |
| 4,155,192 A * | 5/1979 | Varaney | .................. | A01K 85/16 43/42.32 |
| 4,471,556 A * | 9/1984 | Dworski | .................. | A01K 85/16 43/42.23 |
| 4,671,006 A * | 6/1987 | Schuyler, Jr. | .................. | A01K 85/16 43/42.47 |
| 5,092,073 A * | 3/1992 | Kaecker | .................. | A01K 85/00 43/42.39 |
| 5,168,652 A * | 12/1992 | Davis | .................. | A01K 85/16 43/42.23 |

(Continued)

*Primary Examiner* — Christopher P Ellis
(74) *Attorney, Agent, or Firm* — Gary McFaline (57) ABSTRACT

A fishing lure having planar sides is provided. The fishing lure having substantially planar sides such that the fishing lure can be made to dart and stop by a user while maintaining the lure's position in the water column. The fishing lure may also include chambers for weights and attractants or any combination thereof. The fishing lure may also include a user-flexible tail that allows a user to control motion within the fishing column.

16 Claims, 9 Drawing Sheets

(56) References Cited

U.S. PATENT DOCUMENTS

| | | | | |
|---|---|---|---|---|
| 5,197,221 | A * | 3/1993 | Kresl | A01K 85/16 43/42.03 |
| 5,381,623 | A * | 1/1995 | Crisp | A01K 85/02 43/42.43 |
| 6,035,574 | A * | 3/2000 | Ware | A01K 85/01 43/42.06 |
| 6,058,644 | A * | 5/2000 | Irwin | A01K 85/16 43/26.2 |
| 6,061,949 | A * | 5/2000 | Fairchild | A01K 85/16 43/42.24 |
| 2004/0049970 | A1 * | 3/2004 | Brown | A01K 85/16 43/42 |
| 2006/0117641 | A1 * | 6/2006 | Kumlin | A01K 85/16 43/42.22 |
| 2006/0254119 | A1 * | 11/2006 | Siirtola | A01K 85/16 43/42.47 |
| 2008/0202016 | A1 * | 8/2008 | Robertson | A01K 85/08 43/42.27 |
| 2013/0192121 | A1 * | 8/2013 | Ford | A01K 85/00 43/42.22 |
| 2014/0123540 | A1 * | 5/2014 | Budd | A01K 85/16 43/42.02 |
| 2015/0000179 | A1 * | 1/2015 | Ulyanov | A01K 85/00 43/42.25 |

* cited by examiner

DARTING FISHING LURE

BACKGROUND

The present application relates to a fishing lure for targeting large game fish. More specifically, the lure targets the Muskellunge (commonly referred to as the Muskie or Musky) fish at various depths.

Fishing, whether for entertainment or sustenance, is a practice enjoyed by many. Fishing generally entails some kind of bait to attract a targeted fish. This bait may be in the form of live fish that are preyed upon by a targeted fish, dead bait that may be eaten by a targeted fish or an artificial lure designed to mimic the appearance and actions of live bait that are preyed upon by a targeted fish. When an artificial lure is used, the motions and actions of the lure are critical for successfully catching fish.

The Muskellunge is a large North American fresh water fish that is prized among anglers. The Muskellunge is a predatory fish that actively and aggressively chases and attacks smaller fish. While there are many techniques for targeting the Muskellunge, a particularly successful technique involves causing an artificial lure to suddenly dart and suddenly stop.

There are currently several artificial lures that have been deigned to dive, float and wiggle all in an attempt to target game fish generally and the Muskellunge particularly. Users of these lures often attempt to employ the dart and stop technique by sharply pulling on their fishing rods. However because their lures have been designed to dive, float, wiggle, move side to side by employing the jerking motion, the lures do not perform the dart and stop motion at a fast enough pace to mimic the motions of a bait fish. Furthermore, the sharp pulls on existing lures cause the lure to dive or rise outside the targeted strike zone for a particular fish.

Therefore, there is a need in the art for a fishing lure that mimics the motions of a bait fish by performing the dart and stop motion at an adequate speed and simultaneously maintaining the lure depth in the required target fish strike zone.

SUMMARY

According to an aspect of the invention, the fishing lure includes a flat top planar surface, a body with flat planar sides and bottom perpendicular to the top surface, a tail, a rounded head and an arced body leading edge. The fishing lure also includes a line attachment point for attaching any type of fishing line, fishing leader or other means controlling the lure and retrieving a captured fish. The fishing lure may further include at least one hook attachment point for attaching either single hook, treble hooks or other type of device for holding a fish after the fish strikes the lure, and optional chambers for adding weight or sound devices.

According to another aspect of the invention, the fishing lure includes a flat top planar surface, a body that is narrower than the top surface along the longitudinal axis of the lure, a tail that is flexibly adjustable, a head that is rounded along the longitudinal axis and angled along a top planar axis and having an arced body leading edge. The fishing lure also includes a line attachment point for attaching any type of fishing line, fishing leader or other means for controlling the lure and retrieving a captured fish. The fishing lure may further include at least one hook attachment point for attaching either single hook, treble hooks or other type of device for holding a fish after the fish takes the lure.

According to another aspect of the invention, the fishing lure includes a flat top planar surface, a body that is narrower than the top surface along the longitudinal axis of the lure, a tail that is flexibly adjustable, a head that is angled along the longitudinal axis and angled along a top planar axis and having an arced body leading edge. The fishing lure also includes a line attachment point for attaching any type of fishing line, fishing leader or other means for controlling the lure and retrieving a captured fish. The fishing lure may further include at least one hook attachment point for attaching either single hook, treble hooks or other type of device for holding a fish after the fish takes the lure.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features and advantages are merely illustrative and are not considered elements or limitations of the appended claims except where explicitly recited in a claim(s). Similarly, reference to "the invention" shall not be construed as a generalization of any inventive subject matter disclosed herein and shall not be considered to be an element or limitation of the appended claims except where explicitly recited in a claim(s).

Figure 1:
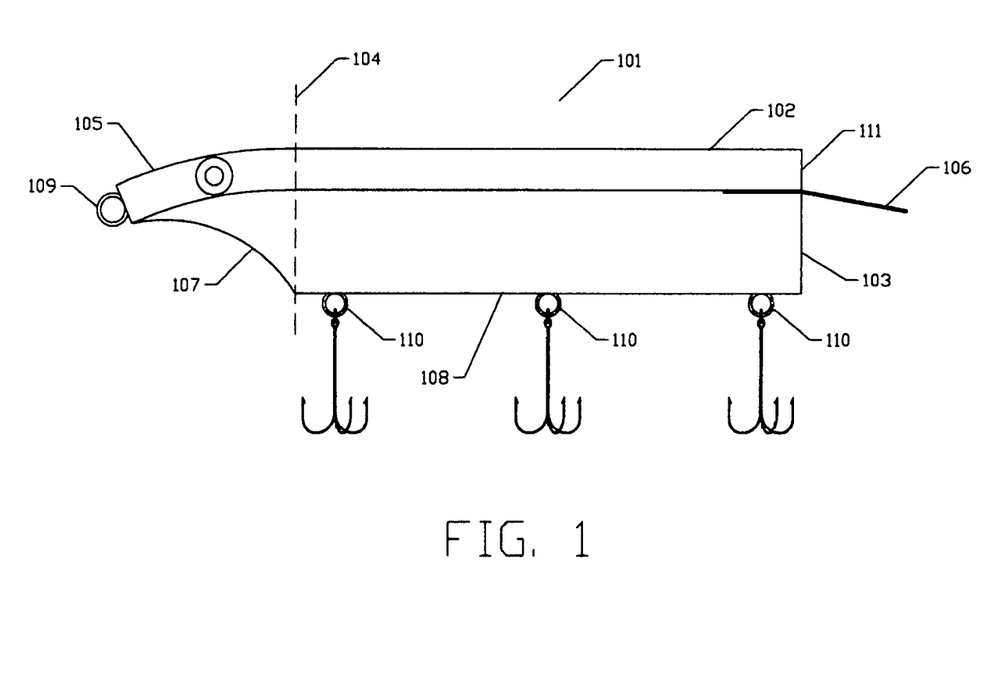
FIG. 1 is a side view of the fishing lure according to various aspects.

With reference to the drawings, and in particular with reference to FIG. 1, a fishing lure capable of mimicking the motions of fish is presented. As shown in FIG. 1, the fishing lure 101 has a top planar surface 102 and a body 103. As used throughout this description, the term "planar" means substantially flat while allowing for fillets, rounds, bevels or other smoothing of geometrical intersections. The top planar surface 102 has a curved front end 105 that leads to the top planar surface 102 such that the top planar surface 102 is tangential to the curved front end 105. The curved front end 105 will preferably have a radius between 4 and 8 inches. The fishing lure 101 has a tail 106 opposite to the curved front end 105. The body 103 of the fishing lure 101 is positioned underneath the top planar surface 102 and parallel to the longitudinal axis 201 (shown in FIG. 2A). The body 103 has a planar bottom surface 108 that is parallel to the top planar surface 102. The fishing lure 101 includes a line attachment point 109 for attaching fishing line, a fishing leader or other connective line as is common in the art. The top planar surface 102 has a height 111 that is uniform throughout the length of the lure 101 and of sufficient material so as to allow for the inclusion of the line attachment point 109. Hook attachment points 110 are optionally included in the lure such that one or more hooks are included depending on the intended use of the lure (i.e. hooks are included when the lure is used as a single bait and hooks are excluded when the lure serves as a decoy). The arced front end 107 is the leading edge of the body 103. The arced front end 107 is constructed such that the arc begins at the curved front end 105 and ends at a point where the planar bottom surface 108 begins.

Figure 2A:
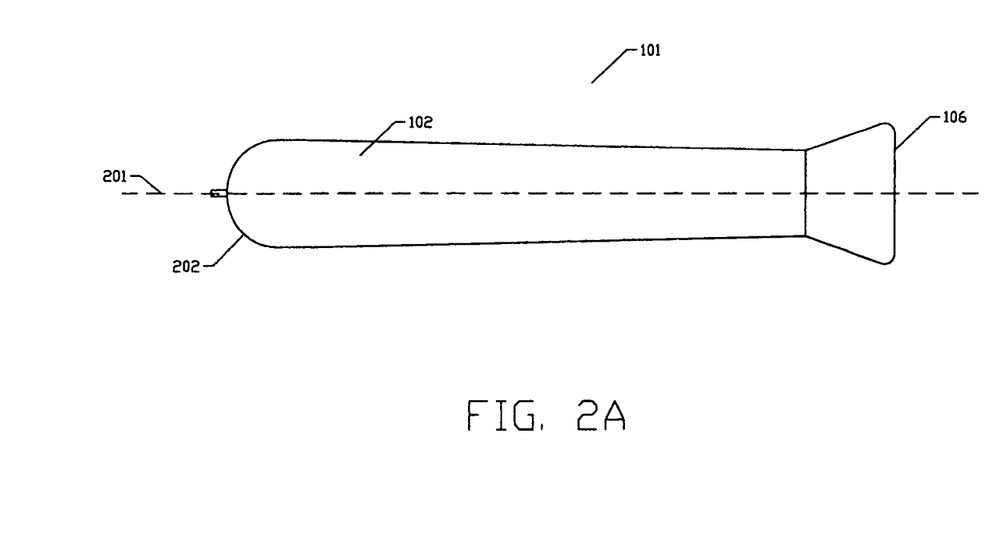
FIG. 2A is a top view of the fishing lure according to various aspects.

Referring to FIG. 2A, the fishing lure 101 has a longitudinal axis 201 through the center of the lure and perpendicular to the top planar surface 102. The top planar surface 102 has a rounded front end 202. The rounded front end 202 is distinct from the curved front end 105 of FIG. 1 in that the rounded front end 202, when viewed from above, is perpendicular to the longitudinal axis 201. In some embodiments, the width of the top planar surface 102 along the longitudinal axis 201 reduces gradually. Similarly, the tail 106 may, in some embodiments, increase in width along the longitudinal axis 201. In some embodiments, the tail 106 may be constructed from a thin metal such that the tail 106 is flexibly adjustable. The adjustability of the tail 106 is advantageous in that users may seek to have the fishing lure 101 dart vertically (along the fishing column) as well as horizontally.

Figure 2B:
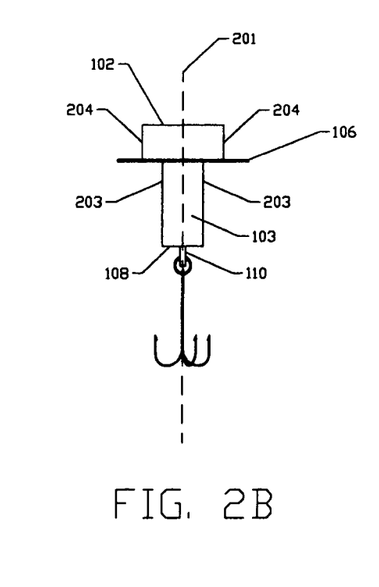
FIG. 2B is a rear view of the fishing lure according to various aspects.

FIG. 2B provides a rear view of the fishing lure 101. As seen in FIG. 2B, the body 103 is positioned underneath the top planar surface 102 and parallel to the longitudinal axis 201. The body 103 has planar body sides 203 and a planar bottom surface 108. The distance between the planar body sides 203 is narrower than the distance between the top planar surface sides 204 along the longitudinal axis 201. The ratio between the distance of the planar body sides 203 and the top planar surface sides 204 may differ according to preferred use of the fishing lure 101. However, in a preferred embodiment of the fishing lure 101, the distance between the top planar surface sides 204 will be twice the distance between the planar body sides. Similarly, the tail 106 may be positioned at any vertical point along the longitudinal axis 201, but is preferably positioned between the top planar surface 102 and the body 103. In some embodiments, the edges of the top planar surface 102 may be squared, beveled or rounded. Similarly, the edges of the bottom planar bottom surface 108 may also be squared, beveled or rounded.

Figure 3A:
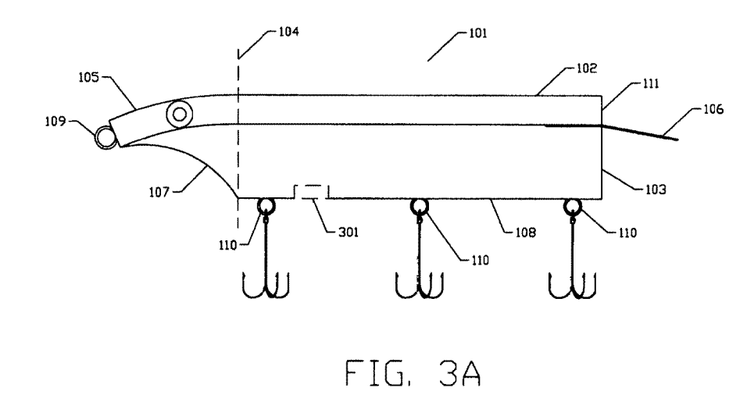
FIG. 3A is a side view of the fishing lure according to various aspects.
Figure 3B:
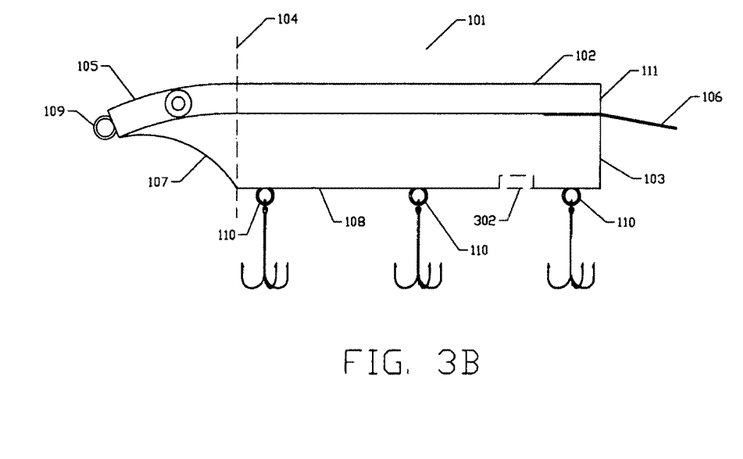
FIG. 3B is a side view of the fishing lure according to various aspects.

FIG. 3 depicts an alternate embodiment of the fishing lure 101 having at least one chamber 301 in the body 103. The chamber 301 may be accessible from either the planar bottom surface 108 or either of the planar body sides 203 shown in FIG. 2B. While the chamber 301 is preferably located on the body 103, the chamber 301 may located anywhere on the lure including the top planar surface 102. The chamber 301 is sized so as to allow a user to add accessories to the lure. The accessories may include, but are not limited to, lead weights, sound making devices, rattling devices, scents, reflectors and streamers.

Figure 4:
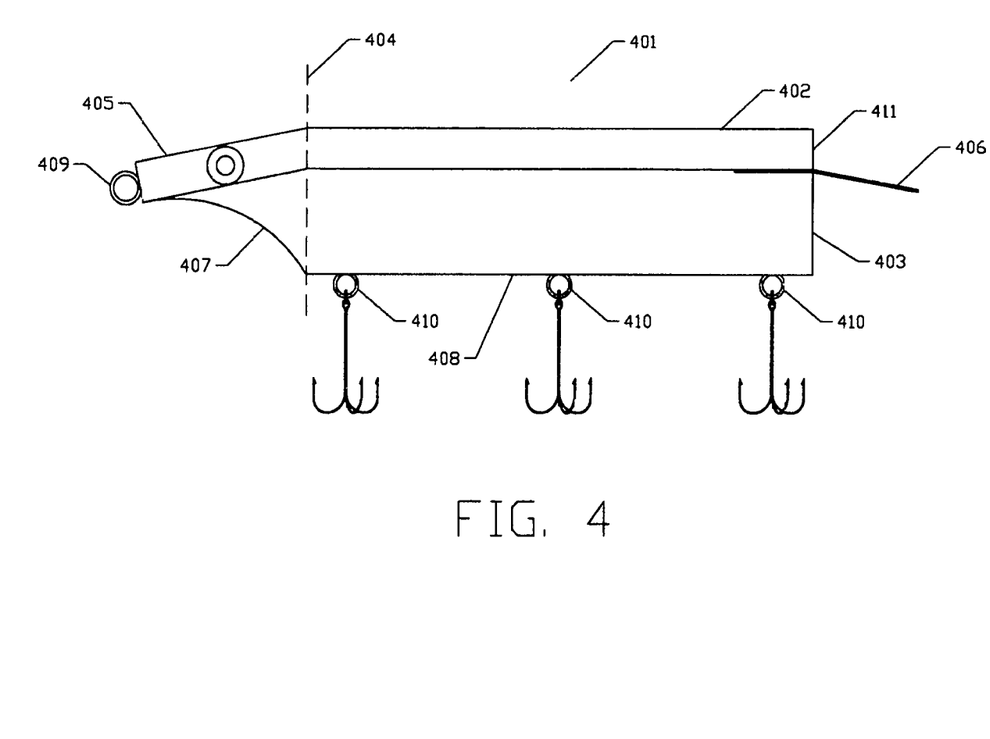
FIG. 4 is a side view of an alternative embodiment with an angled top leading edge of the fishing lure.

FIG. 4 depicts yet another alternate embodiment of the invention. As shown in FIG. 4, the fishing lure 401 has a top planar surface 402 and a body 403. The top planar surface 402 has an angled front end 405. The angled front end 405 is angled with respect to the top planar surface 402 and along the longitudinal axis 501 (shown in FIG. 5A). The fishing lure 401 has a tail 406 at the end of the top planar surface 402 that is opposite to the angled front end 405. The body 403 of the fishing lure 401 is positioned underneath the top planar surface 402 and parallel to the longitudinal axis 501 (shown in FIG. 5A). The body 403 has a planar bottom surface 408 that is parallel to the top planar surface 402. The fishing lure 401 includes a line attachment point 409 for attaching fishing line, a fishing leader or other connective line as is common in the art. The top planar surface 402 has a height 411 that is uniform throughout the length of the lure 401 and of sufficient material so as to allow for the inclusion of the line attachment point 409. Hook attachment points 410 are optionally included in the lure such that one or more hooks are included depending on the intended use of the lure (i.e. hooks are included when the lure is used as a single bait and hooks are excluded when the lure serves as a decoy). The arced front end 407 is the leading edge of the body 403. The arced front end 407 is constructed such that the arc begins at the angled front end 405 and ends at a point where the planar bottom surface 408 begins.

Figure 5A:
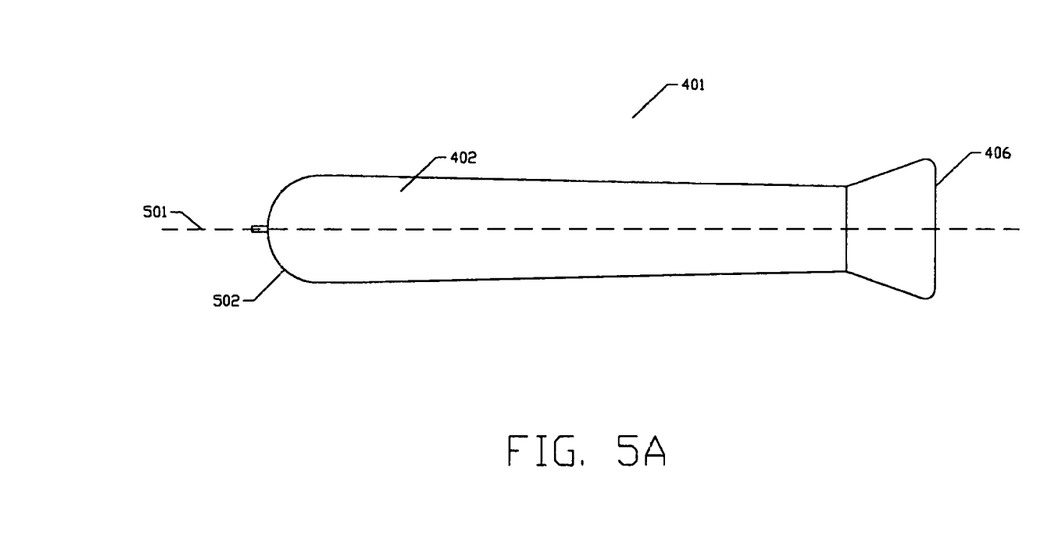
FIG. 5A is a top view of an alternative embodiment with an angled top leading edge of the fishing lure.

Referring to FIG. 5A, the fishing lure 401 has a longitudinal axis 501 through the center of the lure and perpendicular to the top planar surface 402. The top planar surface 402 has a rounded front end 502. The rounded front end 502 is distinct from the angled front end 405 of FIG. 4 in that the rounded front end 502, when viewed from above, is perpendicular to the longitudinal axis 501. In some embodiments, the width of the top planar surface 402 along the longitudinal axis 501 reduces gradually. Similarly, the tail 406 may, in some embodiments, increase in width along the longitudinal axis 501. In some embodiments, the tail 406 may be constructed from a thin metal such that the tail 406 is flexibly adjustable. The adjustability of the tail 406 is advantageous in that user may seek to have the fishing lure 401 dart vertically (along the fishing column) as well as horizontally.

Figure 5B:
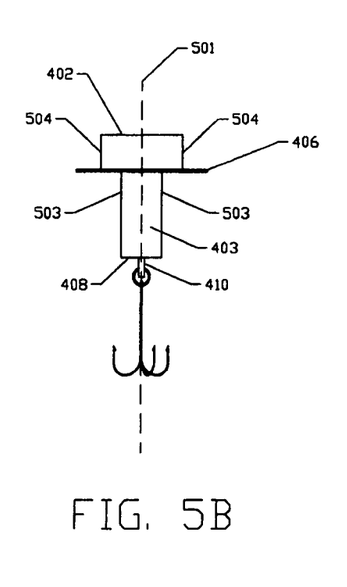
FIG. 5B is a rear view of an alternative embodiment with an angled top leading edge of the fishing lure.

FIG. 5B provides a rear view of the fishing lure 401. As seen in FIG. 5B, the body 403 has planar body sides 503 and a planar bottom surface 408. The distance between the planar body sides 503 is narrower than the distance between the top planar surface sides 504. The ratio between the distance of the planar body sides 503 and the top planar surface sides 504 may differ according to preferred use of the fishing lure 401. However, in a preferred embodiment of the fishing lure 401, the distance between the top planar surface sides 504 will be twice the distance between the planar body sides. Similarly, the tail 406 may be positioned at any vertical point along the longitudinal axis 501, but is preferably positioned between the top planar surface 402 and the body 403.

Figure 6A:
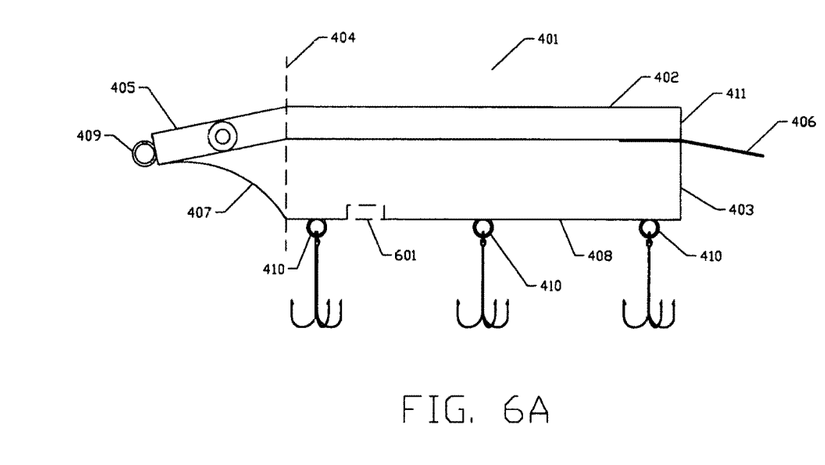
FIG. 6A is a top view of another alternative embodiment with an angled front top surface.
Figure 6B:
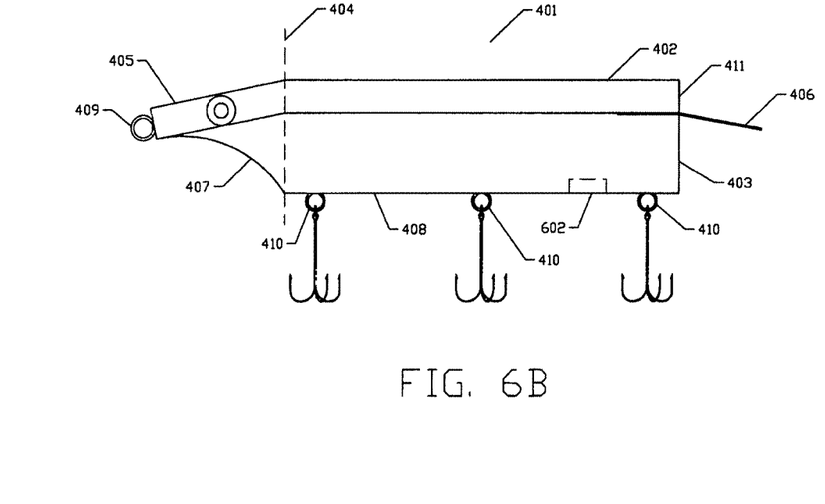
FIG. 6B is a top view of another alternative embodiment with an angled front top surface.

FIGS. 6A and 6B depicts an alternate embodiment of the fishing lure 401 having at least one chamber 601 in the body 403. The chamber 601 may be accessible from either the planar bottom surface 408 or either of the planar body sides 503 shown in FIG. 5B. While the chamber 601 is preferably located on the body 503, the chamber 601 may located anywhere on the lure including the top planar surface 402. The chamber 601 is sized so as to allow a user to add accessories to the lure. The accessories may include, but are not limited to, lead weights, sound making devices, rattling devices, scents, reflectors and streamers.

Figure 7:
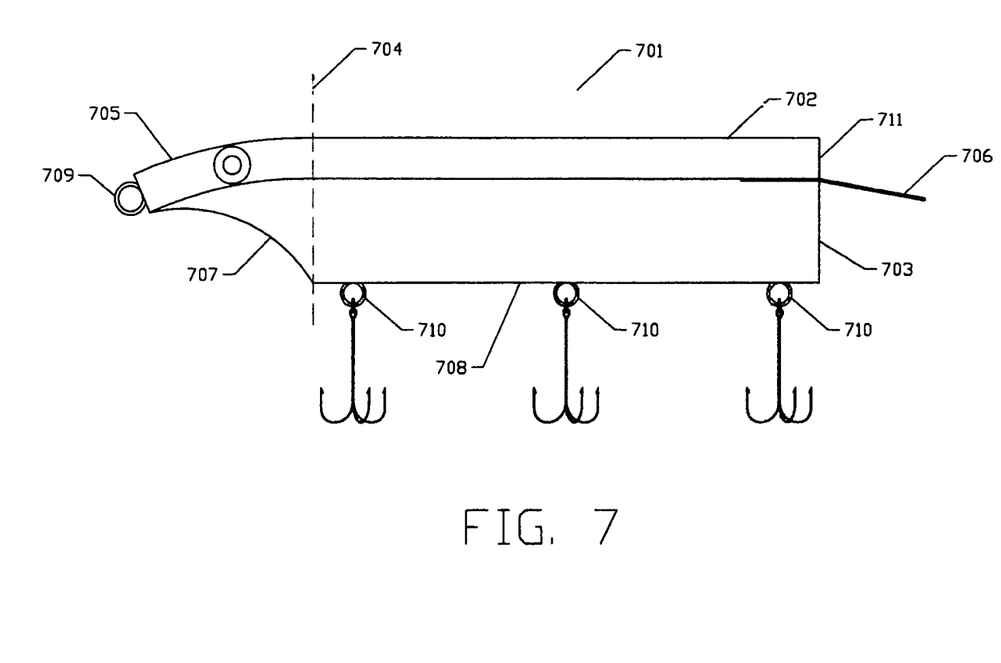
FIG. 7 is a side view of another alternative embodiment with an angled front top surface.

FIG. 7 depicts another alternate embodiment of the invention. As shown in FIG. 7, the fishing lure 701 has a top planar surface 702 and a body 703. The top planar surface 702 has a curved front end 705 such that the top planar surface 702 is tangential to the curved front end 705. The fishing lure 701 has a tail 706 at the end of the top planar surface 702 that is opposite to the curved front end 705. The body 703 of the fishing lure 701 is positioned underneath the top planar surface 702 and parallel to the longitudinal axis 801 (shown in FIG. 8A). The body 703 has a planar bottom surface 708 that is parallel to the top planar surface 702. The fishing lure 701 includes a line attachment point 709 for attaching fishing line, a fishing leader or other connective line as is common in the art. The top planar surface 702 has a height 711 that is uniform throughout the length of the lure 701 and of sufficient material so as to allow for the inclusion of the line attachment point 709. Hook attachment points 710 are optionally included in the lure such that one or more hooks are included depending on the intended use of the lure. The arced front end 707 is the leading edge of the body 703. The arced front end 707 is constructed such that the arc begins at the curved front end 705 and ends at a point where the planar bottom surface 708 begins.

Figure 8A:
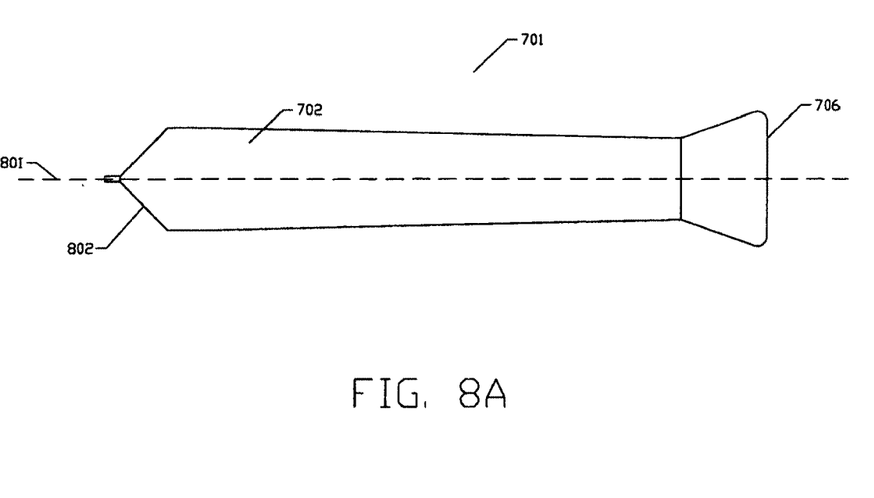
FIG. 8A is a top view of another alternative embodiment with an angled top front end.

Referring to FIG. 8A, the fishing lure 701 has a longitudinal axis 801 through the center of the lure and perpendicular to the top planar surface 702. The top planar surface 702 has an angled top front end 802. The angled top front end 802 is distinct from the angled front end 705 of FIG. 7 in that the angled top front end 502, when viewed from above, is perpendicular to the longitudinal axis 801. In some embodiments, the width of the top planar surface 702 along the longitudinal axis 801 reduces gradually. Similarly, the tail 706 may, in some embodiments, increase in width along the longitudinal axis 801. In some embodiments, the tail 706 may be constructed from a thin metal such that the tail 706 is flexibly adjustable. The adjustability of the tail 706 is advantageous in that user may seek to have the fishing lure 701 dart vertically (along the fishing column) as well as horizontally.

Figure 8B:
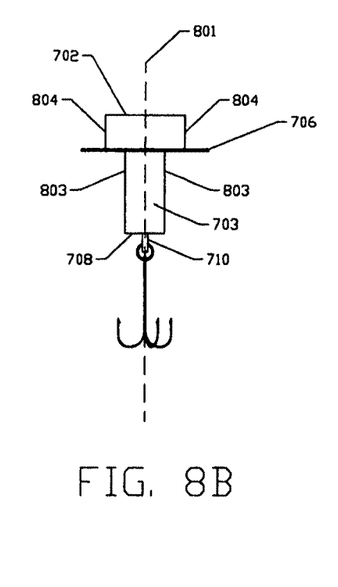
FIG. 8B is a rear view of another alternative embodiment with an angled top front end.

FIG. 8B provides a rear view of the fishing lure 701. As seen in FIG. 8B, the body 703 has planar body sides 803 and a planar bottom surface 808. The distance between the planar body sides 803 is narrower than the distance between the top planar surface sides 804. The ratio between the distance of the planar body sides 803 and the top planar surface sides 804 may differ according to preferred use of the fishing lure 701. However, in a preferred embodiment of the fishing lure 701, the distance between the top planar surface sides 804 will be twice the distance between the planar body sides. Similarly, the tail 706 may be positioned at any vertical point along the longitudinal axis 801, but is preferably positioned between the top planar surface 702 and the body 703.

Figure 9A:
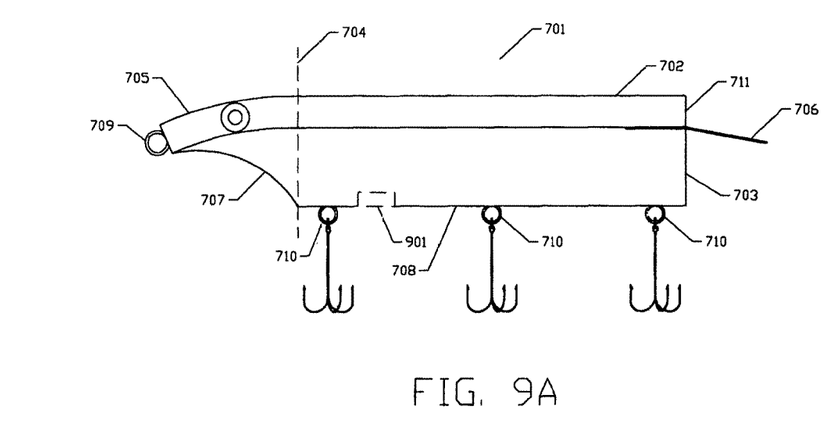
FIG. 9A is a side view of an alternate embodiment having an accessory chamber at the front end.
Figure 9B:
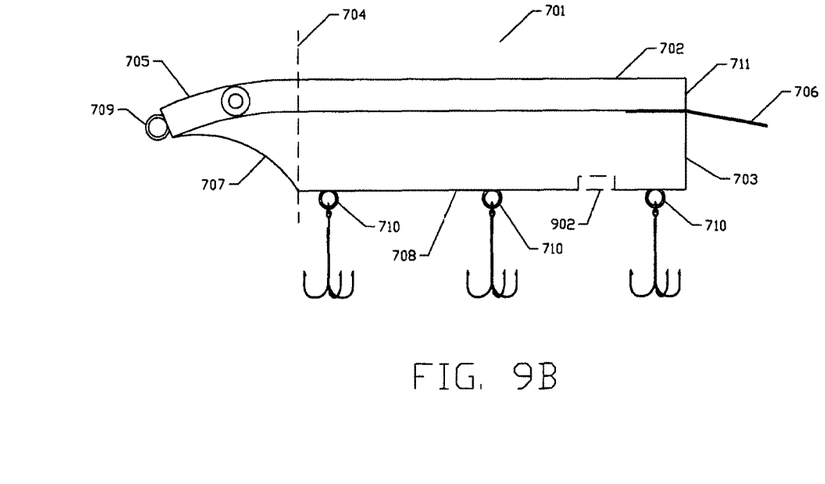
FIG. 9B is a side view of an alternate embodiment having an accessory chamber near the rear end.

FIG. 9 depicts an alternate embodiment of the fishing lure 701 having at least one chamber 901 in the body 703. The chamber 901 may be accessible from either the planar bottom surface 708 or either of the planar body sides 803 shown in FIG. 8B. The chamber 901 is sized so as to allow a user to add sufficient standard lead fishing weights (for example, egg sinkers or split shot weights) to modify the buoyancy of the fishing lure 701 as desired.

The descriptions of the various aspects herein have been presented for the purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical applications or the technical improvement over technologies found in the marketplace, or to enable others of ordinary skill in the art to understand the aspects disclosed herein.

While the foregoing is directed to aspects of the present invention, other further aspects of the invention may be devised without departing from the basic scope thereof, and the scope thereof is determined by the claims that follow.

What is claimed is:

1. A darting and diving fishing lure for targeting game fish, the fishing lure comprising:
   a top planar surface having a curved front end;
   a body having planar sides and bottom;
      said body being positioned underneath the top planar surface and parallel to the longitudinal axis of the fishing lure and wherein the body is narrower than the top planar surface along the longitudinal axis of the fishing lure;
   a line attachment point attached to the curved front end of the top surface;
   a tail positioned opposite to the curved front end;
   at least one hook attachment point attached to the body.

2. The fishing lure of claim 1 wherein the body has an arced front end that ends at a planar bottom surface.

3. The fishing lure of claim 2 wherein the tail is flexibly adjustable.

4. The fishing lure of claim 3 wherein the top surface is twice as wide as the body along the longitudinal axis.

5. The fishing lure of claim 3 wherein the top planar surface has a rounded front end.

6. The fishing lure of claim 5 wherein the top planar surface has squared top edges.

7. The fishing lure of claim 6 wherein the body has squared bottom edges.

8. The fishing lure of claim 1 further comprising an accessory chamber.

9. A fishing lure for targeting game fish comprising:
   a top planar surface having an angled front end;
   a body having planar sides and bottom;
      said body being positioned underneath the top planar surface and parallel to the longitudinal axis of the fishing lure and wherein the body is narrower than the top planar surface along the longitudinal axis of the fishing lure;
   a line attachment point attached to the angled front end of the top surface;
   a tail positioned opposite to the angled front end;
   at least one hook attachment point attached to the body.

10. The fishing lure of claim 9 wherein the body has an arced front end that ends at a planar bottom surface.

11. The fishing lure of claim 10 wherein the tail is flexibly adjustable.

12. The fishing lure of claim 11 wherein the top surface is twice as wide as the body along the longitudinal axis.

13. The fishing lure of claim 11 wherein the top planar surface has a rounded front end.

14. The fishing lure of claim 13 wherein the top planar surface has an angled top front end.

15. The fishing lure of claim 9 further comprising an accessory chamber.

16. A darting and diving fishing lure for targeting game fish, the fishing lure comprising:
   a top planar surface;
   a body having planar sides and bottom;
      said body being positioned underneath the top planar surface and parallel to the longitudinal axis of the fishing lure and wherein the body is narrower than the top planar surface along the longitudinal axis of the fishing lure;
   a line attachment point attached to the curved front end of the top surface.

* * * * *